H. B. WALBRIDGE.
RAILROAD RAIL JOINTS.

No. 184,741. Patented Nov. 28, 1876.

WITNESSES.
J. Wm Garner
F. M. Burnham.

INVENTOR.
H. B. Walbridge
per
F. A. Lehmann, Atty

UNITED STATES PATENT OFFICE.

HENRY B. WALBRIDGE, OF BROOKLYN, NEW YORK.

IMPROVEMENT IN RAILROAD-RAIL JOINTS.

Specification forming part of Letters Patent No. 184,741, dated November 28, 1876; application filed May 4, 1876.

*To all whom it may concern:*

Be it known that I, HENRY B. WALBRIDGE, of Brooklyn, in the county of Kings and State of New York, have invented certain new and useful Improvements in Devices for Holding Fish-Plates; and I do hereby declare the following to be a full, clear, and exact description of the invention, such as will enable others skilled in the art to which it pertains to make and use it, reference being had to the accompanying drawings, which form part of this specification.

My invention relates to an improvement in devices for holding fish-plates in position; and it consists in the combination of eye screw-bolts, washers, wedge-shaped keys, nuts, and springs for holding the wedges in position, as will be more fully described hereinafter, whereby a cheap, simple, and effective fastening is produced, which does away with the usual nuts, and the devices for holding them.

The accompanying drawings represent my invention.

$a$ represents the ends of two rails, and $c$ the fish-plates. Passing through both plates and the rails are the bolts $d$, which have a screw-thread cut upon one of their ends, and an enlarged slotted head, $e$, formed upon the other. The screw ends of the bolts are passed through the fish-plates and rails, and screwed into the large nuts $g$ until the bolts have been screwed up or drawn through sufficiently far. The nuts $g$ are made large enough to be prevented from turning by striking against the top or bottom of the rail, and hence, as long as the bolt cannot turn, the nut cannot work loose or be taken intentionally off. After the nut $g$ has been applied to the bolt a washer, $h$, having an elongated hole through it of the shape of the head $e$, is passed over the head until it rests against the fish-plate, as shown, when a wedge-shaped key, $i$, is driven through the eye, so as to clamp all the parts firmly and securely together.

The small ends of the wedges are turned toward each other, and in order to prevent them from working loose they are united together by a spring-wire, $l$. This spring should possess sufficient tension to not only hold the wedges in position, but to draw them together when loose, and may be made in any desired form or size, or of any suitable material, its only object being to keep the two wedges tightly in position.

Instead of making the nuts so large that they cannot turn, recesses may be made in the plates to receive them, and in this manner they may be made as small as desired.

Figure 1:
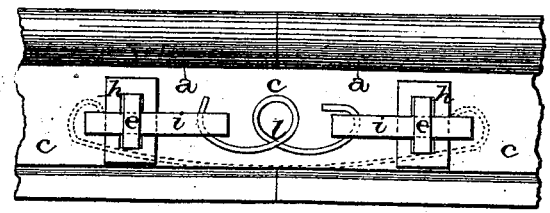
Figure 2:
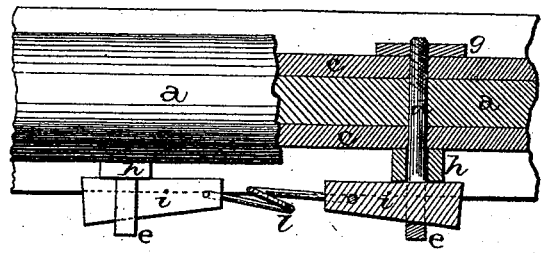
Figure 5:
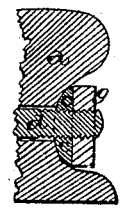
Figure 3:
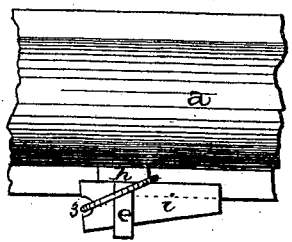
Figure 4:
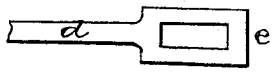

The spring may also be used for holding the wedge in position, as shown in Fig. 3. Here the spring is made in the shape of a ring, is passed over the small end of the wedge, seated against the washer, and then swung round over the large end of the bolt, where it catches in a notch, 3, in the end of the bolt to keep it from being displaced. The spring may also be used, as shown in dotted lines.

Having thus described my invention, I claim—

1. The combination of the bolts $d$, having a screw-thread upon one end to receive a nut, $g$, and a slotted head upon the other, with the washer $h$ and key $i$, substantially as shown and described.

2. The combination of the rails $a$, plates $c$, bolts $d$, heads $e$, nuts $g$, washers $h$, keys $i$, and spring $l$, substantially as set forth.

In testimony that I claim the foregoing I have hereunto set my hand this 1st day of May, 1876.

HENRY B. WALBRIDGE.

Witnesses:
 F. A. LEHMANN,
 R. M. BARR.